United States Patent
Sbar et al.

(10) Patent No.: US 8,500,503 B2
(45) Date of Patent: Aug. 6, 2013

(54) APPARATUS AND METHOD FOR REPAIR OF DEFECTS IN AN ELECTRONIC ENERGY CONTROL OR DISPLAY DEVICE

(75) Inventors: Neil L. Sbar, Northfield, MN (US); Harvey Kalweit, Faribault, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 0 days.

(21) Appl. No.: 13/537,574

(22) Filed: Jun. 29, 2012

(65) Prior Publication Data

US 2012/0302122 A1    Nov. 29, 2012

Related U.S. Application Data

(62) Division of application No. 13/117,439, filed on May 27, 2011.

(51) Int. Cl.
*H01J 9/50* (2006.01)
(52) U.S. Cl.
USPC .................................................. 445/2; 445/61
(58) Field of Classification Search
USPC .................................................. 445/2, 61–63
See application file for complete search history.

(56) References Cited

U.S. PATENT DOCUMENTS

| | | | |
|---|---|---|---|
| 6,201,214 B1 | 3/2001 | Duffin | |
| 6,337,758 B1 | 1/2002 | Beteille et al. | |
| 6,878,900 B2 | 4/2005 | Corkum et al. | |
| 6,937,380 B2 | 8/2005 | Fanton et al. | |
| 7,531,101 B2 | 5/2009 | Beteille | |
| 2003/0052104 A1 | 3/2003 | Matsumoto et al. | |
| 2003/0111447 A1 | 6/2003 | Corkum et al. | |
| 2006/0285068 A1 | 12/2006 | Kawada et al. | |
| 2007/0241690 A1* | 10/2007 | Smith | 315/169.2 |
| 2010/0233931 A1* | 9/2010 | Yamagata et al. | 445/61 |

FOREIGN PATENT DOCUMENTS

| | | |
|---|---|---|
| CN | 101697040 A | 4/2010 |
| DE | 202007012687 U1 | 1/2008 |
| EP | 2036652 A1 | 3/2009 |
| JP | 3069914 A | 3/1991 |

OTHER PUBLICATIONS

International Search Report and Written Opinion for Application No. PCT/US2012/036585 dated Sep. 25, 2012.

* cited by examiner

*Primary Examiner* — Anne Hines
(74) *Attorney, Agent, or Firm* — Lerner, David, Littenberg, Krumholz & Mentlik, LLP

(57) ABSTRACT

An apparatus for repair of a defect in an electronic energy control device may include a position indicating means for indicating a position at which to fixedly position a mounting unit relative to a portion of an electronic energy control device including a defect to be repaired, where the device is fixed in position. An imaging and repair assembly of the apparatus has an optical imaging range and a laser repair range. When the mounting unit is mounted to a support surface to fixedly position the mounting unit at the position indicated by the position indicating means and the imaging and repair assembly is attached to the mounting unit, the portion of the electronic energy control device is within the imaging range and the repair range.

10 Claims, 10 Drawing Sheets

APPARATUS AND METHOD FOR REPAIR OF DEFECTS IN AN ELECTRONIC ENERGY CONTROL OR DISPLAY DEVICE

CROSS-REFERENCE TO RELATED APPLICATIONS

The present application is a divisional of U.S. application Ser. No. 13/117,439, filed May 27, 2011, the disclosure of which is incorporated herein by reference.

FIELD

This invention relates to electronic energy control and display devices containing electronically and optically active media, and more particularly, to repairing defects in electronic energy control and display devices.

BACKGROUND

Large area electronic energy control, display or lighting products that are permanently mounted in structures, such as buildings, ships, aircraft, trains, buses, or cars, may include electronic or electro-optical devices (collectively "electronic energy control devices"), such as electrochromic, OLED, electroluminescent, electro-reflective, LCD, and other monolithic display or lighting devices, in which an electronically and optically active media is contained between closely spaced electrodes. The appearance of the lighting or a display created by such electronic energy control devices may be adversely affected by the presence of defects in the active media that locally modify the potential between the electrodes.

For example, electrochromic devices include electrochromic materials that are known to change their optical properties, in response to application of an electrical potential, so as to make the device, for example, more or less transparent or reflective, or have a desired coloration.

The manufacture of an electrochromic device typically includes forming an electrochromic (EC) film stack including a plurality of layers of conductive and electrochromic material on a substrate, such as glass. See, for example, U.S. Pat. Nos. 5,321,544, 6,856,444, 7,372,610 and 7,593,154, incorporated by reference herein. During the manufacturing process, defects sometimes may be formed in one or more of the layers of the EC film that can cause the electrochromic device to have a different optical behavior than desired, or lack a desired optical behavior, at or near the location of the defect when the device is operated by applying an electrical potential thereto. The defect may be a short between conductive layers of the EC film stack caused, for example, by foreign contaminants, or a material non-uniformity or scratch in one or more of layers of the EC film stack, that causes the EC device, when operated, to have at the location of the defect optical properties different than those desired and present at locations adjacent to the defect. The defect, hence, may cause the EC device to have an undesirable aesthetic appearance when operated.

Although various techniques are known and may be performed to repair a defect in an electronic energy control device, such as an electrochromic device, during manufacture, some defects still may remain in a final, manufactured electronic energy control device product. For example, an electrochromic device included in a final, manufactured electrochromic device product, such as an insulated glass unit (IGU), may include defects visible only when the electrochromic device transitions between an energized and non-energized state, and defects not visible in visible or near infrared light. Oftentimes, such defects are noticed or appear only after installation of the electrochromic device product, for example, as an exterior window in a high rise building.

Systems for repair of defects in an electronic energy control device used during manufacture of an electronic energy control device product typically are very large in size and heavy, thereby making it difficult, if not impossible, for a single person to transport and handle the system. For example, a defect repair system used at a facility for manufacture of an electrochromic energy control device product ("factory repair system") usually includes a support framework that supports and encloses an electrochromic device product, such as a window, to be repaired, a camera and camera positioning device, and a laser and a laser positioning device. The camera and laser positioning devices are of a size large enough to permit the camera and laser to be positioned at any point over the surface of the window, which may be as large as 1850 mm×3200 mm or sometimes larger in size. The camera and laser positioning devices, thus, usually have significant weight on the order of hundreds of pounds. In addition, the support framework is usually of a large size, which is larger than the size of a glass product to be repaired, and has a weight of several thousand pounds.

Therefore, after installation of an electronic energy control device product, repair of a defect at the location of the installation usually cannot be performed. Instead, the usual courses of action are replacement of the product, or removal of the product for repair at a manufacturing facility. For example, the repair of an window with an electrochromic device that is installed, for example, in an office building, using a factory repair system typically involves removing the window and transporting it to the manufacturing facility, temporarily covering the hole in the building resulting from removal of the window, such as with plywood or another window, to keep out weather, repairing the window at the facility with the factory repair system, transporting the repaired window from the facility to the building, removing the temporary cover and re-installing the repaired window. This repair process is time consuming, and the expense associated with removing the window and replacing the repaired window, which sometimes may require a person to work from the outside of the building, many stories above the ground, is usually substantial.

Therefore, there exists a need for an apparatus for repair of a defect in an electronic energy control device having a compact construction and a weight and size providing for ease of transport, handling and operation of the apparatus by a single person.

SUMMARY

In accordance with an aspect of the invention, a an apparatus for repair of a defect in an electronic energy control device may include a mounting unit including means for mounting the mounting unit to a support surface to fixedly position the mounting unit, and a position indicating means for indicating a position at which to fixedly position the mounting unit relative to a portion of an electronic energy control device including a defect to be repaired, where the electronic energy control device to be repaired is fixed in position. The apparatus may include an imaging and repair assembly having an optical imaging range and a laser repair range. The assembly may include an optical imaging means for acquiring an image and means for moving the optical imaging means to acquire an image from within the optical imaging range, a laser means for emitting a light beam capable of ablating material of an electronic energy control device and a means for moving the light beam within the repair range. In addition, when the mounting unit is mounted to the support surface to fixedly position the mounting unit at the position indicated by the position indicating means and the imaging and repair assembly is attached to the mounting unit, the portion of the electronic energy control device to be repaired is within the imaging range and the repair range.

In accordance with another aspect of the invention, a method for repair of a defect in an electronic energy control device may include indicating a position at which to fixedly position a mounting unit relative to a portion of an electronic energy control device including a defect to be repaired, where the electronic energy control device to be repaired is fixed in position. Also, the method may include mounting the mounting unit to a support surface to fixedly position the mounting unit in accordance with the indicated position. Further, the method may include acquiring optical images and emitting a light beam capable of ablating a material in an electronic energy control device with an imaging and repair assembly. In addition, when the mounting means is mounted to the support surface to fixedly position the mounting unit at the position indicated, the portion of the electronic energy control device to be repaired is within an imaging range and a laser repair range of the assembly attached to the mounting unit.

In accordance with another aspect of the invention, an apparatus for repair of a defect in an electrochromic device product may include a mounting unit including suction means for mounting the mounting unit to a support surface to fixedly position the mounting unit. The apparatus may include a laser pointer unit for indicating a position at which to fixedly position the mounting unit relative to a portion of an electrochromic device product including an electrochromic device with a defect to be repaired, where the electrochromic product to be repaired is fixed in position. The laser pointer unit may be detachably attachable to the mounting unit, and the position may be indicated when an indicating beam emitted from the laser pointer unit intersects a marking on an outer surface of the electrochromic product overlying the defect. The apparatus may further include an imaging and repair assembly having an optical imaging range and a laser repair range. The assembly may be detachably attachable to the mounting unit and include an optical imaging means for acquiring an image, means for moving the optical imaging means to acquire an image from within the optical imaging range, a laser means for emitting a light beam capable of ablating a portion of a layer of an electrochromic device and means for moving the light beam within the repair range. In addition, when the mounting unit is mounted to the support surface to fixedly position the mounting unit at the position indicated and the imaging and repair assembly is attached to the mounting unit, the portion of the electrochromic product is within the imaging range and the repair range.

DETAILED DESCRIPTION

In accordance with aspects of the present invention, an apparatus for repair of a defect in an electronic or electro-optic energy control or display device (collectively "electronic energy control device") within an electronic energy control device product, such as an electrochromic device included in an insulated glass unit (IGU), has a size, weight and construction providing for ease of transport of the apparatus, such as to an installed location of the electronic energy control device product, by a single person. In addition, a single person, with relative ease, may hold and manipulate the apparatus to fixedly mount the apparatus at a desired location relative to the installed product, and operate the apparatus when mounted, so that a defect in the installed product may be repaired at the installed location relatively quickly, such as within one hour, and without large disturbances to operation of a building or other structure at or in which the product is installed, including transportation systems, such as aircraft, trucks, trains, ships, or cars. For purposes of illustrating features of the invention, an exemplary apparatus for repair of a defect in an electrochromic device that may be included in a large area electrochromic device product, and methods of use of the apparatus, are described below. It is to be understood, however, that the features of the invention are similarly applicable to an apparatus for repair of a defect in other electronic energy control devices, such as OLED, electroluminescent, electro-reflective, LCD, and other monolithic display or lighting devices, contained in electronic energy control device products.

Figure 1:
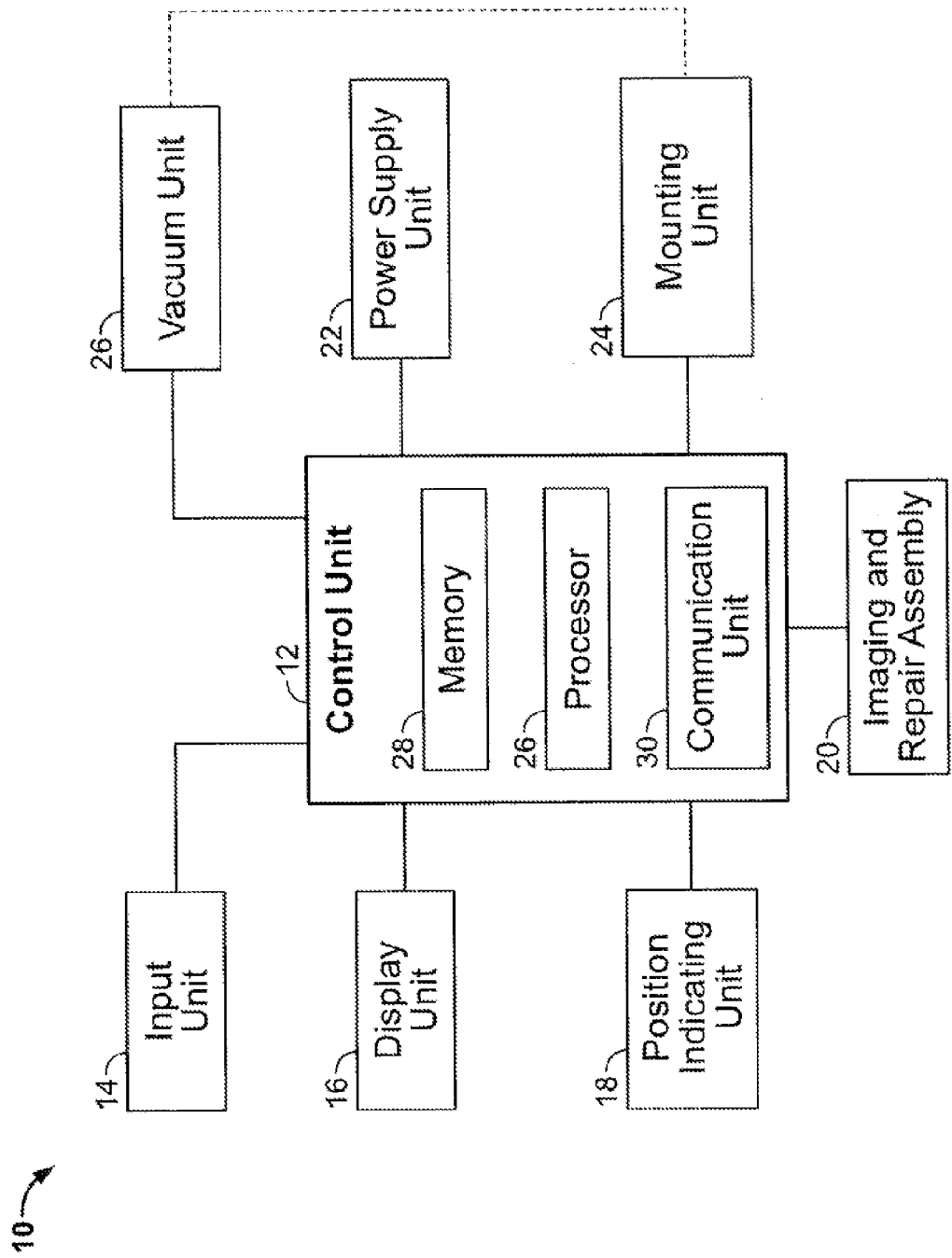
FIG. 1 is a block diagram of an apparatus for repair of a defect in an electrochromic device, in accordance with an aspect of the invention.

FIG. 1 illustrates a block diagram of an apparatus for repair of a defect in an electrochromic device, in accordance with an aspect of the invention. The electrochromic device to be repaired, for example, may be contained in a final, manufactured electrochromic device product. For ease of reference, the term "EC product" is used herein to mean a product including an electrochromic device, and an EC product may include, for example, an IGU having two or more glass panes or suspended membranes, such as polymer films or heat reflectors, any laminated electrochromic device, such as a laminated device in which the electrochromic device is in contact with thermoplastic material, an electrochromic device contained within a specific atmosphere or environment including dry air, argon or other noble gases, enhanced oxygen, fluorocarbon gases, a liquid such as a violagen, or a source of ions, such as described in U.S. Pat. No. 6,337,758 and U.S. Pat. No. 6,529,308, incorporated by reference herein.

Figure 2:
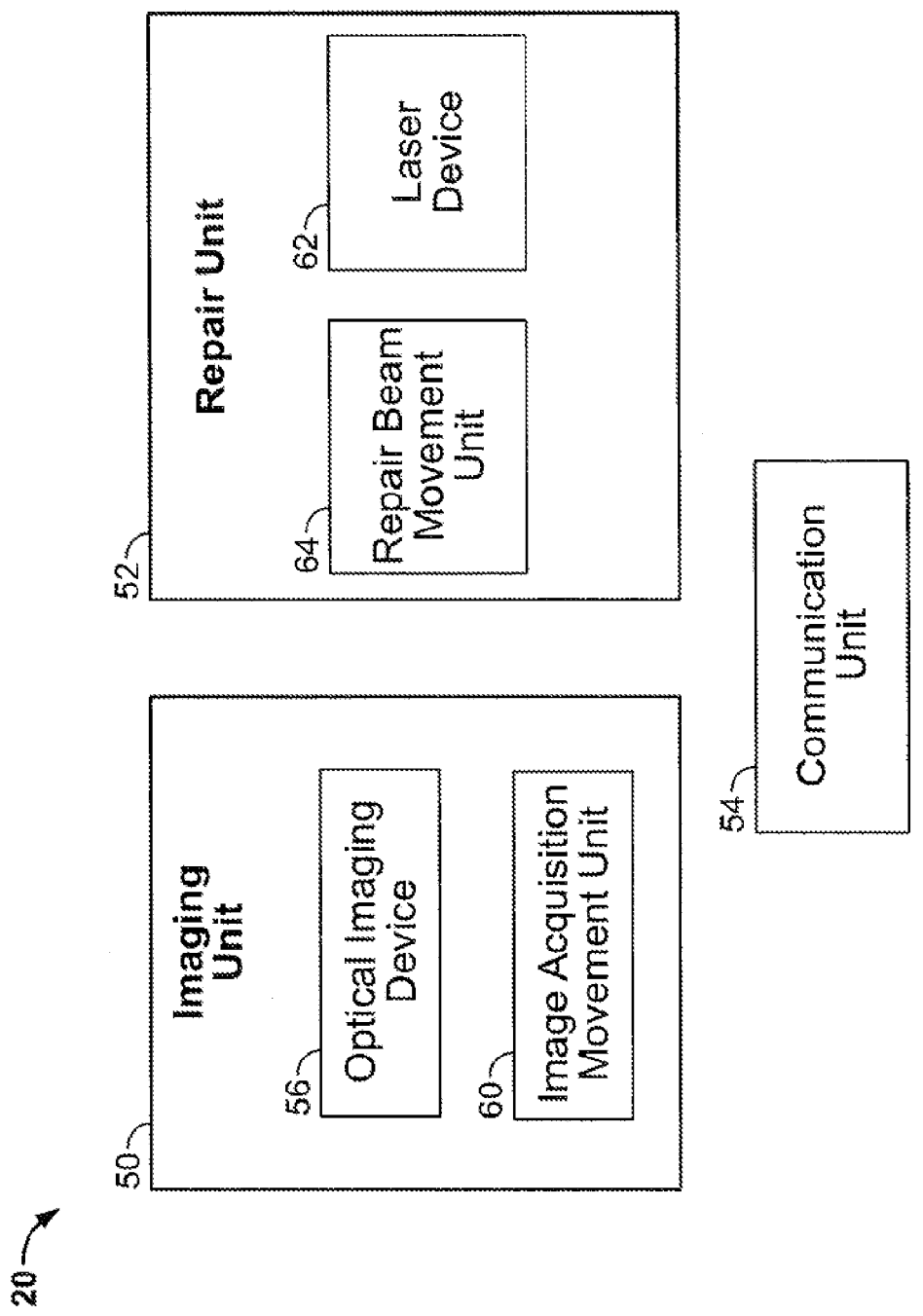
FIG. 2 is a block diagram of an imaging and repair assembly, in accordance with one embodiment of the invention.

Referring to FIG. 1 and also to FIG. 2, the apparatus 10 may include a control unit 12, an input unit 14, a display unit 16, a position indicating unit 18, an imaging and repair assembly 20, a power supply unit 22, a mounting unit 24 and a vacuum unit 26.

The input unit 12 may be a conventional device, such as a keypad, keyboard, mouse, switch, joystick, touch pad, trackball, etc., operable by a user to supply input information to the control unit 12. As described in detail below, the input information may provide for control of the apparatus 10 to operate an imaging unit 50 and a repair unit 52 of the imaging and repair assembly 20 as part of a defect repair process.

The display unit 16 may be any monitor or display screen, such as an LCD or LED display, that can display information supplied by the control unit 10. In one embodiment, the display unit 16 may be part of a head mountable device, such as a visor, that an operator of the apparatus may wear, and include wireless communication capabilities.

The power supply unit 22 may be a device that can be controlled, such as by the control unit 10, to supply electrical power to one or more of components of the apparatus 10.

The vacuum unit 26 may be a device that can be controlled, such as by the control unit 10, to supply or withdraw gas, such as air, through a conduit, so as to create a vacuum. As described below, a vacuum may be created at the mounting unit 24 using the vacuum unit 26 to fixedly secure the mounting unit 24 to a support surface.

The control unit 10 is a conventional data processing device including a processor 26, and a memory 28 for storing data and instructions of a software program executable by the processor 26. In addition, the control unit includes a communication unit 30 that provides wireless and/or wired communication capabilities. The control unit may be communicatively connected with the input unit 14, the display unit 16, the position indicating unit 18, the imaging and repair assembly 20 and the power supply unit 22, and optionally with the mounting unit 24 and the vacuum unit 26. The processor 26 of the control unit 10, by execution of the instructions of the program, may process input data from the input unit 14 and imaging data supplied by the assembly 20, and supply control data to the assembly 20 to control operation of the imaging unit to acquire images of an EC product to be repaired and operation of the repair unit to remove defects from the EC product, in accordance with aspects of the invention.

The imaging and repair assembly 20 may be operable to acquire images of the EC product to be repaired, and in particular images including a defect in the electrochromic device of the EC product, and to repair the defect, such as by controlling emission and movement of an ablating laser beam along a path in the EC product to remove portions of the electrochromic device at or surrounding the defect.

Figure 3:
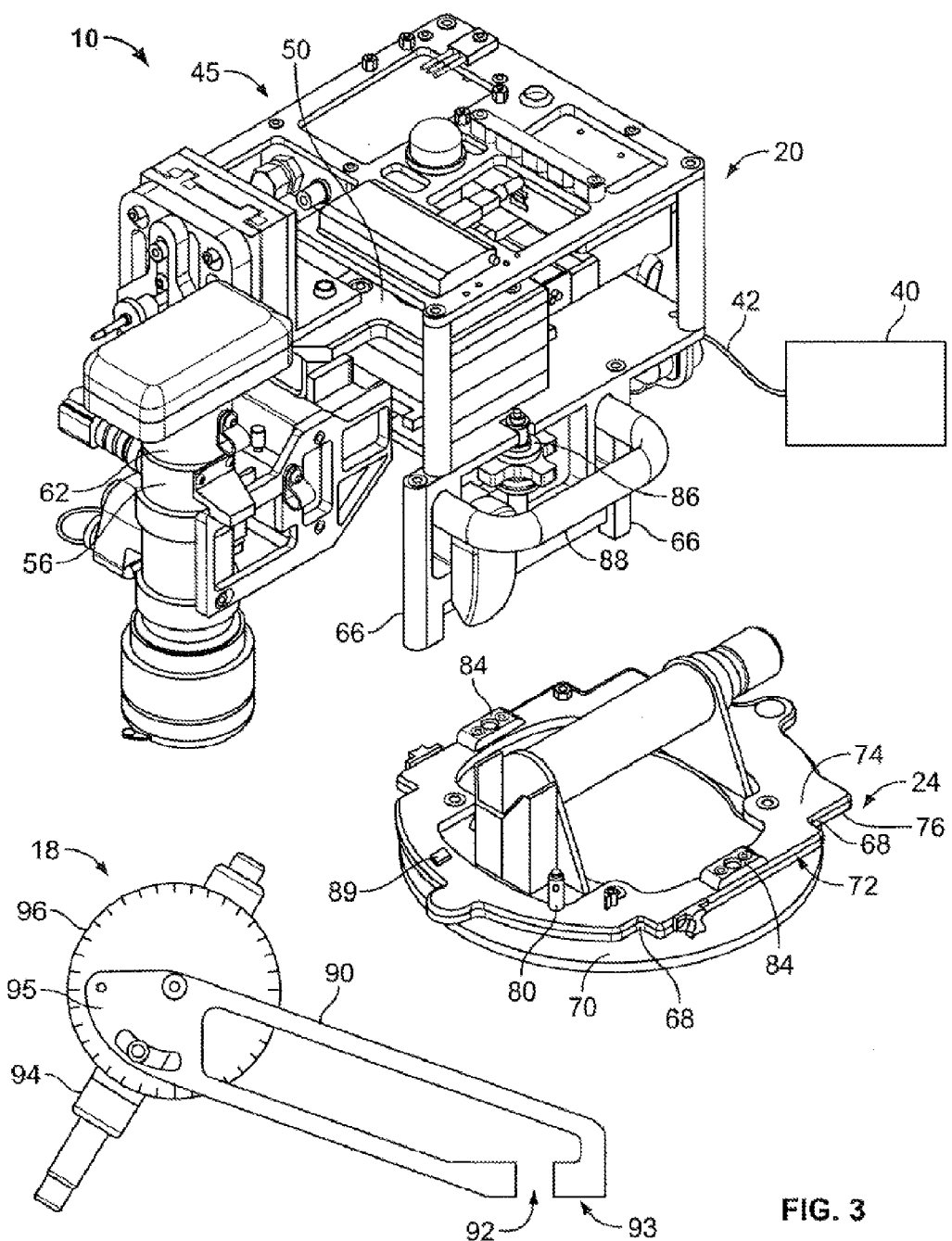
FIG. 3 is an exploded, perspective view of an exemplary apparatus for repair of a defect in an electrochromic device, in accordance with one embodiment.

In a desired embodiment of the apparatus 10 as shown in FIG. 3, the control unit 12, the input unit 14, the display unit 16 and the power supply unit 22, and optionally the vacuum unit 26, may be included in a standalone, remote assembly 40. In addition, the position indicating unit 18, the assembly 20 and the mounting unit 24 may be part of a head assembly 45. A connection harness 42 including cables or lines for conveying electrical power and data, and conduits for conveying gases, such as air, may interconnect the remote assembly 40 with the assembly 20, and optionally the mounting unit 24 and the position indicating unit 18. As discussed below, to repair a defect in an EC product using the apparatus 10, the mounting unit 24 is mounted to a support surface to fixedly position the mounting unit relative to an installed EC product having a defect, so as to provide that the imaging and repair assembly 20 attached to the mounting unit is positioned so that the defect in the EC product may be imaged and repaired by operation of the assembly 20.

The remote assembly 40 includes those components of the apparatus 10 that do not need to be located on or near an installed EC product to be repaired, and desirably includes components of the apparatus 10 likely to have the largest weight, such as the power supply unit and the optional vacuum unit. By limiting the components of the apparatus 10 that are part of the head assembly 45 to only those components that need to be located at or near the defect in the EC product, the size and weight of the head assembly may be minimized, thereby providing for ease of maneuverability of the head assembly by a single person and, in particular, ease of mounting the mounting unit to a support surface to provide for imaging and repair of a defect using the assembly 20 attached to the mounting unit. In a desired embodiment, the weight of the head assembly is less than 30 pounds, and desirably less than 20 pounds and most desirably less than 14 pounds.

Figure 10A:
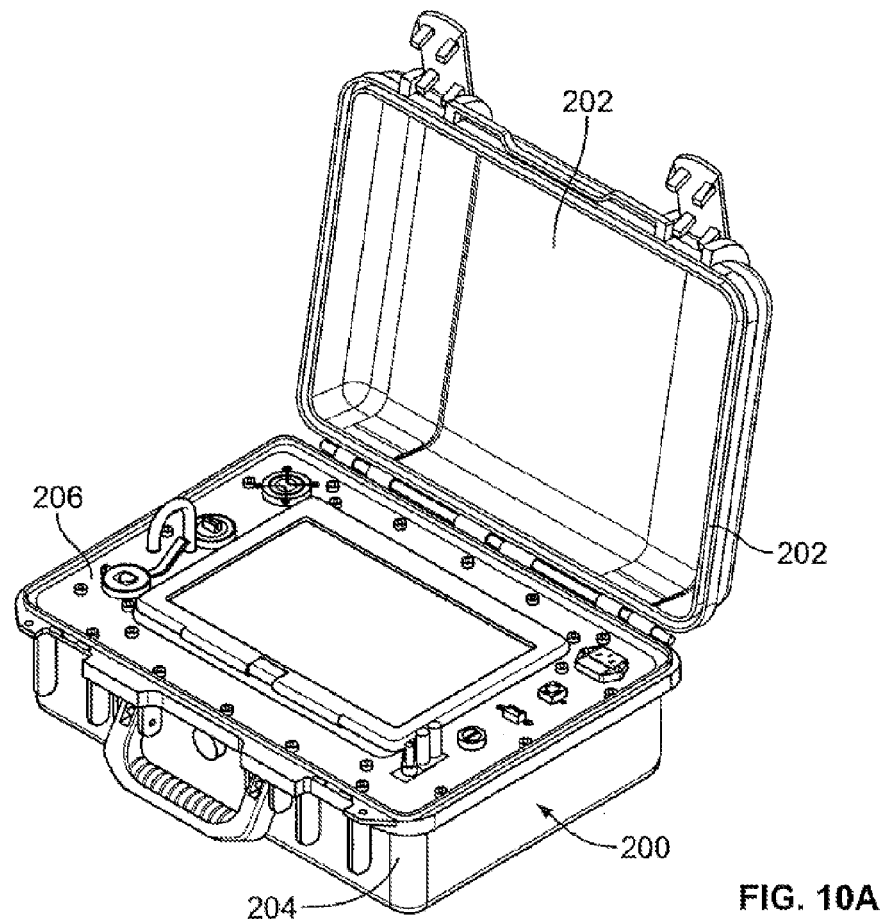
FIG. 10A is a perspective view of an exemplary remote assembly, in accordance with one embodiment.
Figure 10B:
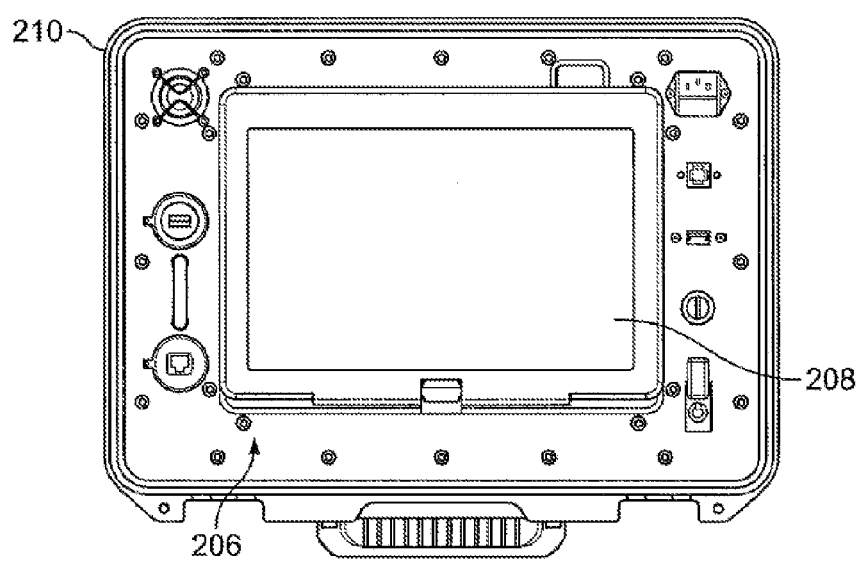
FIG. 10B is a top, plan view of the remote assembly of FIG. 10A.

In one embodiment, referring to FIGS. 10A and 10B, the remote assembly 40 may configured as a case to provide for portability. The case may include a housing 200 having a lid 202 coupled to a base 204, such that the lid may be opened and closed to expose and cover a top surface 206 of the base 204, respectively. The base 204 may contain the control unit 12 (not shown) in an interior portion. The top surface 206 may include a display screen 208, a connector 210 for connection to the harness 42, and other connectors and switches for powering and operating the apparatus 10.

Referring to FIGS. 2-3, the assembly 20 may include an imaging unit 50, a repair unit 52 and a communication unit 54. The imaging unit 50 may include an optical imaging device 56, such as a high resolution imaging camera, which acquires optical images and supplies imaging data representative of the acquired images. Alternatively, the imaging unit may include a plurality of imaging devices, including a thermal imaging device that acquires thermal images. In addition, the imaging unit 50 may include an imaging acquisition movement unit 60 that controls acquisition of optical images by the camera within an imaging range of the imaging unit 50. The unit 60 may be a conventional device for moving the camera 56, or optical components therein such as an objective lens, in three degrees of freedom, such as along three orthogonal axes. For example, the movement unit 60 may include linear motors, piezoelectric drives, voice coils or like elements that may be coupled to and operated to move the camera 56.

An imaging range of the imaging unit 50 corresponds to that portion of an object, such as an EC product, positioned within all fields of view of the camera 56 obtainable, and for which focused images of the portion of the object can be acquired, by movement of the camera 56. For example, when an installed EC product that is fixed in position is arranged opposing the camera, the imaging range may correspond to the entirety of the thickness of a portion of the EC product positioned within all fields of view of the camera obtainable by movement of the camera. To maintain the assembly 20 small in size and weight, the portion of the surface area of the EC product that is within the obtainable fields of view of the camera that define the imaging range is much smaller in size than the outer surface area of a typical EC product. Therefore, precise and stable positioning of the assembly 20 relative to the EC product is critical, because the positioning of the assembly 20 determines which portion of the EC product is within the imaging range of the camera.

The repair unit 52 may include a laser device 62 and a repair beam movement unit 64. The laser device 62 may emit a beam of laser light capable of ablating a portion of an electrochromic device in an EC product arranged opposing the laser device. The laser device 62 may emit a beam at 532 nm having an average power of up to 80 mW. In alternative embodiments, the laser device 62 may be adapted to emit a beam having a wavelength specific to the EC product to be repaired, such as the coloration of the EC product or variations in the electrochromic film stack of the electrochromic device. In one embodiment, the laser device 62 may be controlled to emit a beam of optical light at a sufficient energy to ablate a focused area of less than about 15 square microns positioned at a distance of less than about 20 mm away from the laser. In some embodiments, the intensity of laser light may be between 300-500 mW, and the laser light beam may have a width of 50-250 μm in diameter and a pulse energy density of at least 1 J/cm$^2$. In alternative embodiments, the laser device 62 may be adapted to emit a beam having a pulse energy density specific to the EC product to be repaired.

In addition, the repair unit 52 may include a repair beam movement unit 64 that controls movement of the beam emitted by the laser device 62 within a laser repair range. The beam movement unit 64 may operate to move the laser or optical components therein in three degrees of freedom, such as along three orthogonal axes, to cause the emitted beam to move along a path within the repair range. For example, the movement unit 64 may include scanning mirrors, linear motors, piezoelectric drives, voice coils or like elements that may be coupled to and operated to move the laser or optical components of the laser device 62.

A repair range of the repair unit 52 corresponds to that portion of an object, such as an EC product, positioned a distance from the laser device 62 and through which a beam emitted by the laser device can be moved along a path. For example, when an installed EC product that is fixed in position is arranged opposing the laser device, a laser repair range may correspond to the entirety of the thickness of a portion of the EC product having a predetermined cross-sectional area. Similar to the discussion above concerning the size of the imaging range, to maintain the assembly 20 small in size and weight, the portion of the surface area of the EC product that is within the repair range of the laser device is much smaller in size than the outer surface area of a typical EC product. In addition, the precise and stable positioning of the assembly 20 relative to the EC product is critical for defect repair, because the positioning of the assembly 20 determines the portion of the EC product which is within the repair range of the laser device. In one embodiment, the repair range and the imaging range may be the same or at least partially overlap.

The communication unit 54 is a conventional device that provides wireless or wired communication capability to the assembly 20.

The mounting unit 24 may be a device that can be fixedly secured to a support surface. In the illustrated embodiment as shown in FIG. 3, the assembly 20 and the mounting position indicating unit 18 may be adapted to be detachably attachable to the mounting unit 24. The mounting unit 24 may include a base 72 having a top surface 74 and an opposing bottom surface 76, and a mounting element 70 such as a suction cup extending from the bottom surface 76. In addition, the base 72 may include first latching elements 80, such as a pin extending upwardly from the top surface 74, and second latching elements 84. The second latching elements may include cam latches, draw clamps, fast pins, ball-lock release pins, magnetic latches, or similar engagement devices that may provide for ease of engagement, by a single person, to corresponding latching elements on the assembly 20.

As used in this disclosure, terms such as "upwardly," "downwardly," "vertically" and "horizontally" should be understood as referring to the frame of reference of the element specified and need not conform to the normal gravitational frame of reference. Also, for ease of reference, directions are stated in this disclosure with reference to the "top" or "front" surface 74 of the base of the mounting unit, as shown in FIG. 3. Generally, directions referred to as "upward" shall refer to the direction orthogonal and away from the top surface of the base. Directions referred to as "downward" shall refer to the directions orthogonal to the top surface of the base and opposite the upward direction. A "vertical" direction shall refer to a direction orthogonal to top surface of the base. The term "above" a reference point shall refer to a point upward of the reference point, and the term "below" a reference point shall refer to a point downward of the reference point. The "top" of any individual element shall refer to the point or points of that element which extend furthest in the upward direction, and the term "bottom" of any element shall refer to the point or points of that element which extend furthest in the downward direction.

The suction cup 70 may have a diameter of about eight inches. In some embodiments, the suction cup may be a manually pumpable suction cup.

In an alternative embodiment, the suction cup may be a pneumatic device that creates a vacuum at an interior region of the cup. The vacuum unit 26 may be connected to the mounting unit, and the control unit 12 may, responsive to an input, such as generated by depression of a button 89 on the surface 74 of the base 72, control the vacuum unit to supply or remove gas so as to create a vacuum between the suction cup and a support surface.

In an alternative embodiment, the mounting element 70 may be a self-contained, manually operable vacuum pump.

The support surface may be any surface to which the mounting unit can be fixedly secured using the mounting element 70, for example, the suction cup, to provide that the assembly 20, when attached to the mounting unit, is fixedly positioned at a position relative to the EC product having the defect to be repaired, such that the defect is within the imaging range and the repair range of the assembly 20. The support surface, for example, may be an outer surface of the EC product facing the laser device and camera of the assembly 20 attached to the mounting unit.

The position indicating unit 18 may be a device operable to indicate a position at which to fixedly position the mounting unit relative to a portion of the EC product including the defect to be repaired. Referring to FIG. 3, in the illustrated exemplary embodiment of the apparatus 10, the indicating unit 18 may include a frame 90 containing a latching element 92, such as an aperture, at one end 93. The latching element 92 of the position unit is adapted to be detachably engagable with the first latching element 80 of the mounting unit 24, such that the positioning unit 18 may be detachably attached to the mounting unit by engagement of the latching elements 80 and 92 to each other. In addition, a laser pointer 94, or other optical pointer, may be attached at an end 95 of the frame 90 opposite the end 93. The laser pointer 94 may be a diode laser that emits less than 5 mW at 650 nm.

Figure 5:
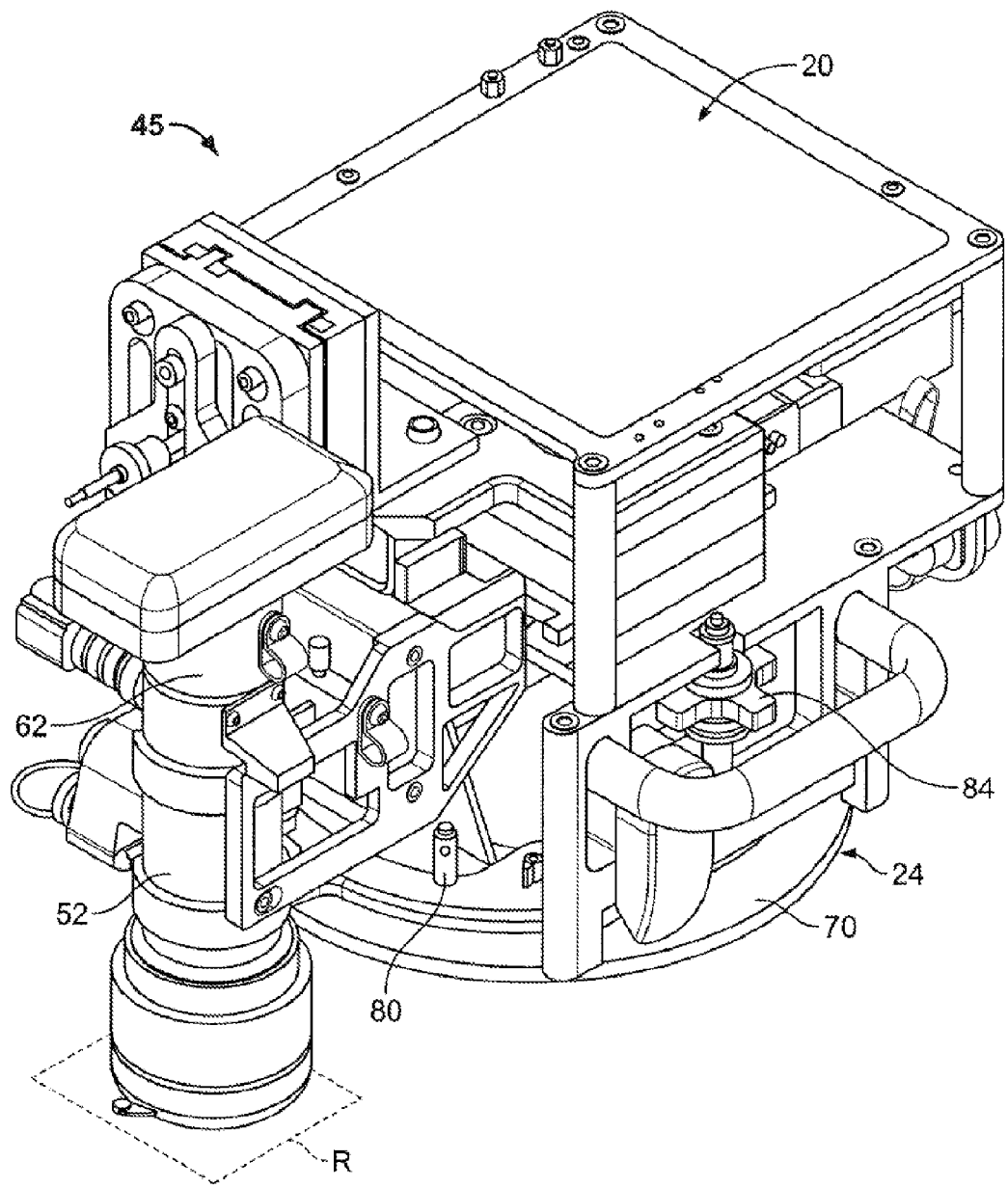
FIG. 5 is a perspective view of the apparatus of FIG. 3 including an imaging and repair assembly attached to a mounting unit, in accordance with one embodiment.

Referring to FIGS. 3 and 5, the assembly 20 may include downwardly facing latching elements 86 adapted to engage with the latching elements 84 of the mounting unit, so as to detachably attach the assembly 20 to the mounting unit. The latching elements 86 may include cam latches, draw clamps, fast pins, ball-lock release pins, magnetic latches, or similar devices that may be easily engaged with the latching elements 84, by a single individual, to secure the assembly 20 to the base 72 of the mounting unit 24. The latching elements 84 and 86 are adapted to provide that the position at which the assembly 20 is attached relative to the mounting unit is reproducible, and that the assembly cannot be moved relative to the mounting unit when attached thereto.

In one embodiment, additional latching elements (not shown) having the same or similar construction as the elements 84 and 86 may be included on the support unit and assembly 20, respectively, to provide for a more secure attachment between the components. In one embodiment, the corresponding additional latching elements may be adapted to be engaged to each other after the latching elements 84 and 84 are engaged to each other.

In addition, the assembly 20 may include handles 88 at opposing vertical sides. The laser device 62 and the camera 56 may be coupled at one vertically extending side of the assembly 20, such that an optical path for imaging and directing a light beam may be generally orthogonal to the outer surface of an EC product to which the mounting unit may be mounted.

In a further embodiment, the assembly 20 may include legs 66 that project downwardly from a bottom surface and are adapted to engage notches 68 positioned at corners of the plate 72. The engagement of the legs with the notches may further enhance a secure and fixed attachment of the assembly 20 to the support unit 24, such that the attached assembly 20 may be fixed at a desired registration position with respect to the support unit 24.

Figure 4:
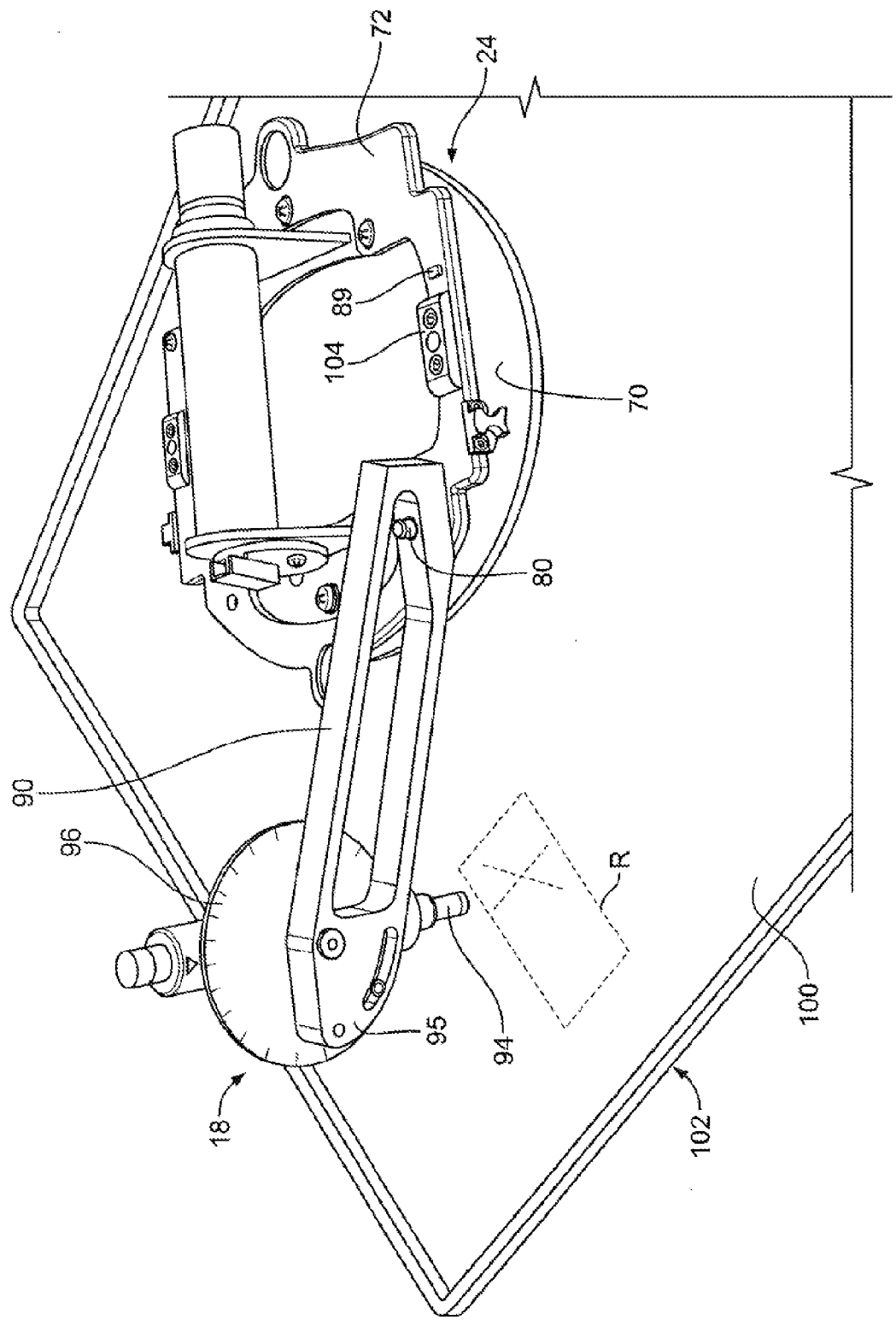
FIG. 4 is a perspective view of the apparatus of FIG. 3 including a position indicating unit attached to a mounting unit, in accordance with one embodiment.

An exemplary process to repair a defect in an EC product which is fixed in position, such as a glass window installed in an office building, using the apparatus 10 is now described. Referring to FIG. 4, a location on an outer surface 100 of an EC product 102 aligned with a defect in an electrochromic device included within the EC product 102 may be visibly marked with an "X", such as using a marker. The position indicating unit 18 may then be attached to the mounting unit 24, which desirably is not attached to the assembly 20, at a predetermined alignment position with respect to the mounting unit, based on engagement of the pin 80 with the latching element 92. With the laser pointer 94 operating to emit a beam, such as a red beam, the mounting unit with the attached position indicating unit may be moved across, and desirably adjacent, the surface 100 until the beam from the laser pointer 94 intersects the "X" marking. When the beam intersects the "X" marking, a position at which to fixedly position the mounting unit relative to the defect in the EC product 120 is indicated. While the position of the beam is maintained to intersect the "X" marking, the mounting unit 24 may then be moved toward the surface 100, desirably in a direction orthogonal to the surface 100, to cause the suction cup 70 to create a vacuum at the surface 100, which mounts the mounting unit fixedly to the surface 100 of the EC product. The mounted mounting unit 24 is thus fixedly positioned relative to the defect in the EC product, in accordance with the position indicated by the positioning unit 18. The mounting unit with the attached position indicating means, together, desirably do not weigh more than about 20 pounds, such that a single person may easily handle and move the mounting unit with the attached position indicating means until a position to fixedly position the mounting unit relative to the EC product is indicated, and then fixedly secure the mounting unit to the surface 100 of the EC product, which may serve as the support surface, in accordance with the position indicated.

The position indicating unit 18 may then be detached from the mounting unit 24. After the unit 18 is detached, an operator holding the assembly 20 by the handles 88 may attach the assembly 20 to the mounting unit 24 at the desired registration position, by causing engagement of the latching means 84 and 86 to each other. The assembly 20 attached to the mounting unit is positioned such that the portion of the EC product including the defect is within the imaging range and repair range of the assembly, which are indicated by broken lines R in FIGS. 4-5. Thus, based on mounting of the mounting unit fixedly in place without the assembly 20 being attached to the mounting unit, the assembly 20 thereafter may be easily positioned in the immediate vicinity of a defect to be repaired by attachment to the mounted mounting unit, thereby providing that the defect in the EC product is within the imaging and repair ranges of the assembly 20. Consequently, the assembly 20 is positioned such that the imaging unit 50 may be operated to acquire images of the defect and the repair unit 52 may be operated to ablate portions of the EC device to repair the defect. In one embodiment, when the assembly 20 is attached to the mounting unit mounted to a surface of the EC product in accordance with the position indicated by the indicating unit, the center of the field of motion of a laser beam emitted by the assembly 20 may be located at or near the defect in the EC product.

Following attachment of the assembly 20 to the mounting unit, the camera 56 may be operated to acquire optical images across an area of the surface of the EC product coextensive with the imaging region R, such as by raster scan across the area, where the area of the surface of the EC product within the imaging region R has a maximum size of about 25 mm$^2$.

Figure 7:
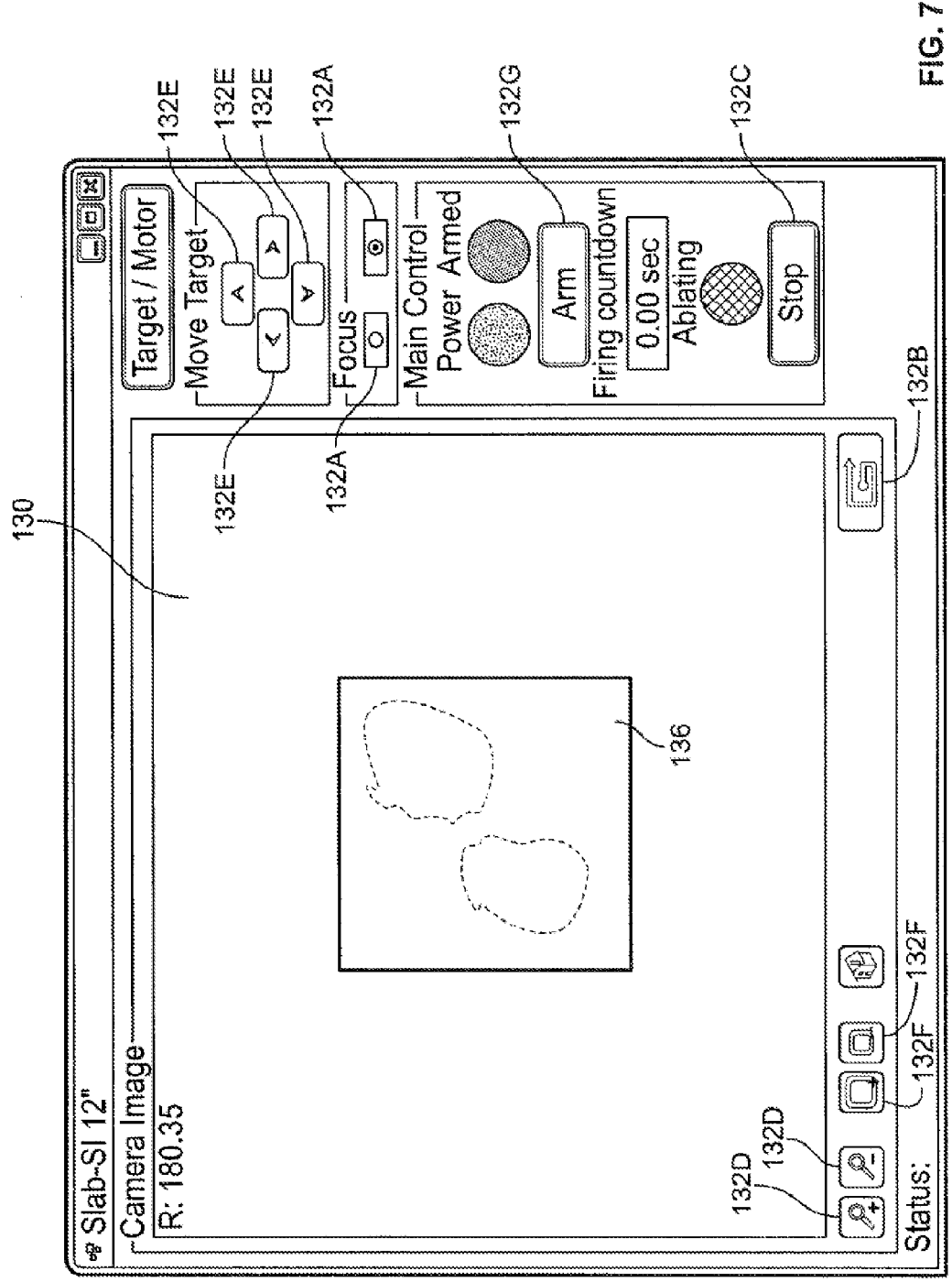
FIG. 7 is a screen display for controlling an imaging and repair assembly, in accordance with one embodiment

In one embodiment, the control unit 10 may, based on imaging data supplied from the camera 56 representative of the acquired images, cause display of a display screen on the display unit 16 showing acquired images 130 with selectable icons 132 for controlling operation of the imaging unit 50 and the repair unit 52, as illustrated in FIG. 7.

Icons 132A may provide focus control of the camera. The operator may initially operate the icons 132A to provide that the camera is positioned vertically closer to or further from the surface 100, to optimize focus at a plane of the defect in the EC product 120.

Figure 8:
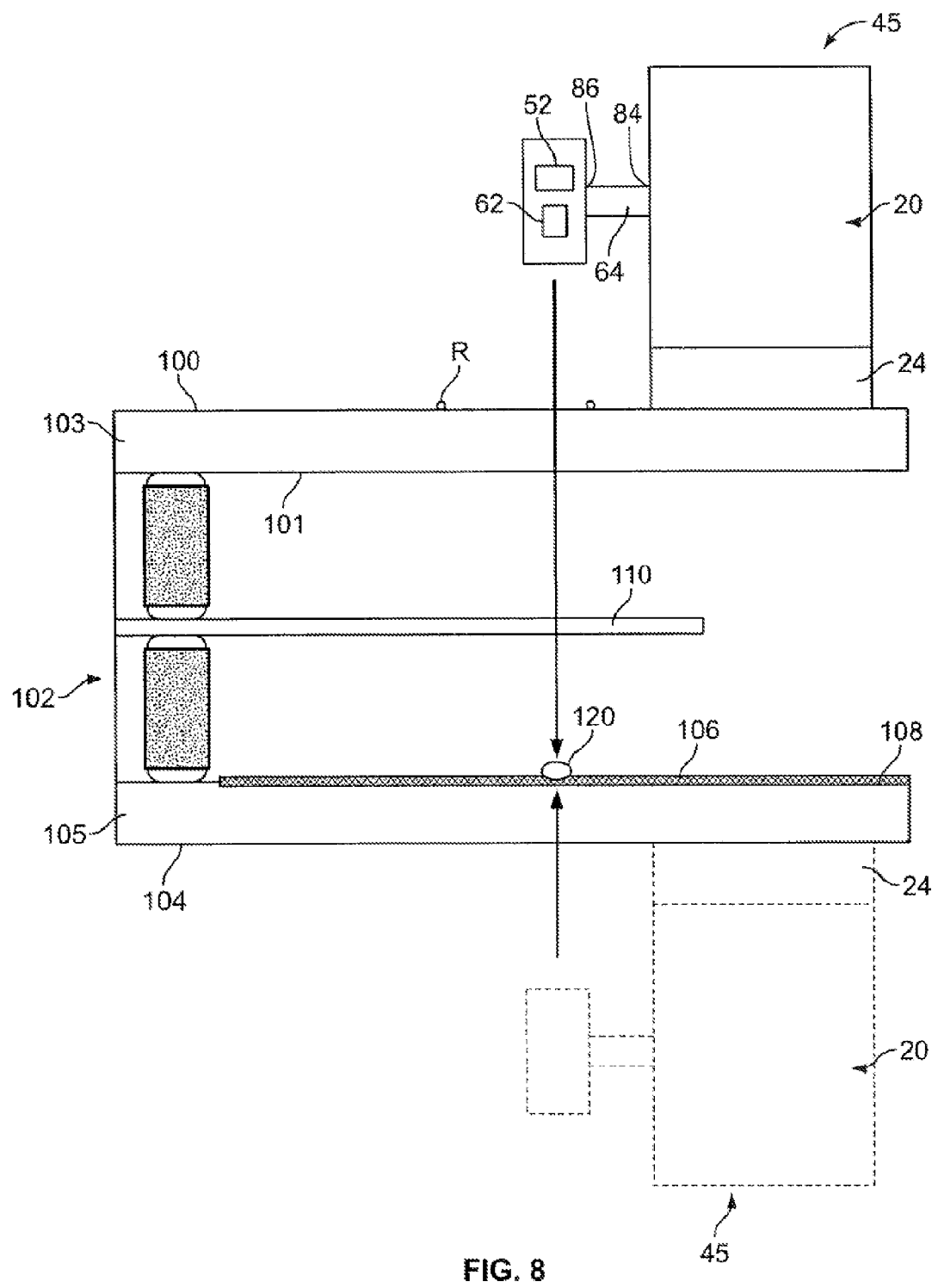
FIG. 8 illustrates exemplary mounting of an apparatus for repair of a defect in an electrochromic device to an electrochromic device product, in accordance with an aspect of the invention.

For example, referring to FIG. 8, the EC product 102 may be formed from opposing cover lite layers 103 and 105, and an interior lite layer 110 disposed between the layers 103 and 105. The layer 103 may include the outer surface 100 and opposing interior surface 101, and the layer 105 may include the surface 104 and opposing interior surface 108. An electrochromic device 106, which includes a defect to be repaired, may be formed at the interior surface 108. When the mounting unit 24 with the attached assembly 20 is attached to the surface 100, the imaging unit may be operated using the icons 132A to move the camera to acquire an image including the defect and provide that the defect is at the focal plane of the camera. Advantageously, referring to FIG. 8, based on the size, weight and construction of the apparatus 10, the mounting unit 24 may be mounted on either of the surfaces 100 and 104 of the EC product 102, such that, as suitable, imaging and repair can be performed from either side of the EC product 100 using the assembly 20 attached to the mounting unit.

Referring to FIG. 7, icon 132B may provide for a systematic search of a portion of the EC product within the imaging region, by movement of the camera 56. The search may begin at the center of the displayed image, which in one embodiment corresponds to the location marked "X" on the EC product 102. A search path may be an increasing rectangular or circular spiral scan with a small overlap between adjacent path views.

Icon 132C may stop a search for the defect, and thus movement of the camera 56, and have the image displayed be the image acquired at the position of the camera 56 when the icon 132C is selected.

In an alternative embodiment, the control unit may perform a machine vision process to detect a defect when the defect appears in a displayed image, and automatically stop searching movement upon detection of the defect. In another embodiment, the control unit may automatically control movement of the camera 56 by the image acquisition movement unit 60 so that the focal plane of the camera is automatically adjusted to intersect the defect.

Icons 132D may provide for increasing and reducing magnification of the displayed image.

Icons 132E may provide for moving the camera in first and second directions that are orthogonal to each other and in a plane parallel to the plane of the surface of the EC product being imaged. In one embodiment, the icons 132E may provide an accelerating movement function that causes the camera to move continuously faster in the first or second directions the longer the icon is depressed. In addition, single clicks of the icons 132E may provide movement of the camera by a predetermined amount in the first or second directions. In a further embodiment, the icons 132E may provide a right-click functionality, such as by use of a mouse or clicking a toggle on a stylus, that moves the camera to a predetermined location, such that an image is displayed in which the portion of the surface of the EC product marked with the X is at the center of the displayed image.

Icons 132F may provide control of a size or configuration of a path 136 to be followed by a beam emitted from the laser device 62 to ablate portions of the electrochromic device of the EC product. Desirably, the path 136 is continuous and completely surrounds a defect. In one embodiment, the path 136 may correspond to a spot region in the EC product coextensive with the defect, such that the beam emitted by the laser is not moved relative when a laser repair is performed. For example, the laser device may be controlled to emit a single pulse to ablate a region of the electrochromic device including the defect.

In alternative embodiment, information for defining the path may be provided to the control unit from the input device.

In an alternative embodiment, the control unit may automatically define a path around or at a defect following detection of the defect using a machine vision function, and then display the path on the display screen.

In another embodiment, the beam may be moved along a path within a region of a plane parallel to the surface of the EC product where the region has a maximum area of about 25 mm$^2$.

In a further embodiment, upon attachment of the assembly 20 to the mounting unit, the repair unit is positioned so that, in the absence of operation of the repair beam movement unit, the position on the surface of the EC product marked X is the position that a beam emitted by the laser device 62 intersects.

Icon 132G may provide for performance of a laser repair by the laser device 62 to ablate portions of the electrochromic device, in accordance with the defined path 136.

In one embodiment, after an operator controls movement of the camera to have an image including a defect displayed, and defines a path 136 for laser ablation using the displayed image including the defect, the repair may be performed by laser ablation by selecting the icon 132G. The laser ablation may be performed to ablate a continuous line, completely through at least an upper transparent conductor in an electrochromic device film stack around the defect. The path may optionally cut through some or all of the remaining electrochromic film stack layers. The path of the beam desirably is a closed figure, such as a circle, oval, or polygon, around the defect.

In another embodiment, the beam of the laser device may be provided to remove all material inside of an area defined by the path 136, either by moving the beam in raster or other systematic manner, or by adjusting the size of the beam.

In a further embodiment, the control unit may be adapted to control activation of a warning light or sound output when the laser device 62 is activated, and delay time between the onset of the warning light or sound and the time when the laser device 62 can be activated.

Following laser ablation, the operator may inspect the EC product on the display, by controlling the camera, to confirm that the desired portion of the electrochromic device was removed, thereby confirming repair of the defect.

Advantageously, the inventive apparatus may be fixedly mounted in proximity to a defect in an EC product, such as a window installed in a building, and the defect can be repaired without removing the window from its frame or mounting structure. For example, the apparatus may be positioned and operated by a single operator who, to repair a defect in an installed window, such as in a window above the floor in a lobby or atrium, may have to stand on a floor or balcony, climb a ladder, stand in a scissor lift or cherry picker bucket, stand on a window washer's hanging scaffolding, or stand on a fixed scaffolding or other temporary support. The handling and operating features of the apparatus provide that a defect may be readily repaired at an installed location of the EC product, even if access to the EC product at the installed location is difficult or limited such that defect repair using the apparatus needs to be performed by a single person.

Figure 6:
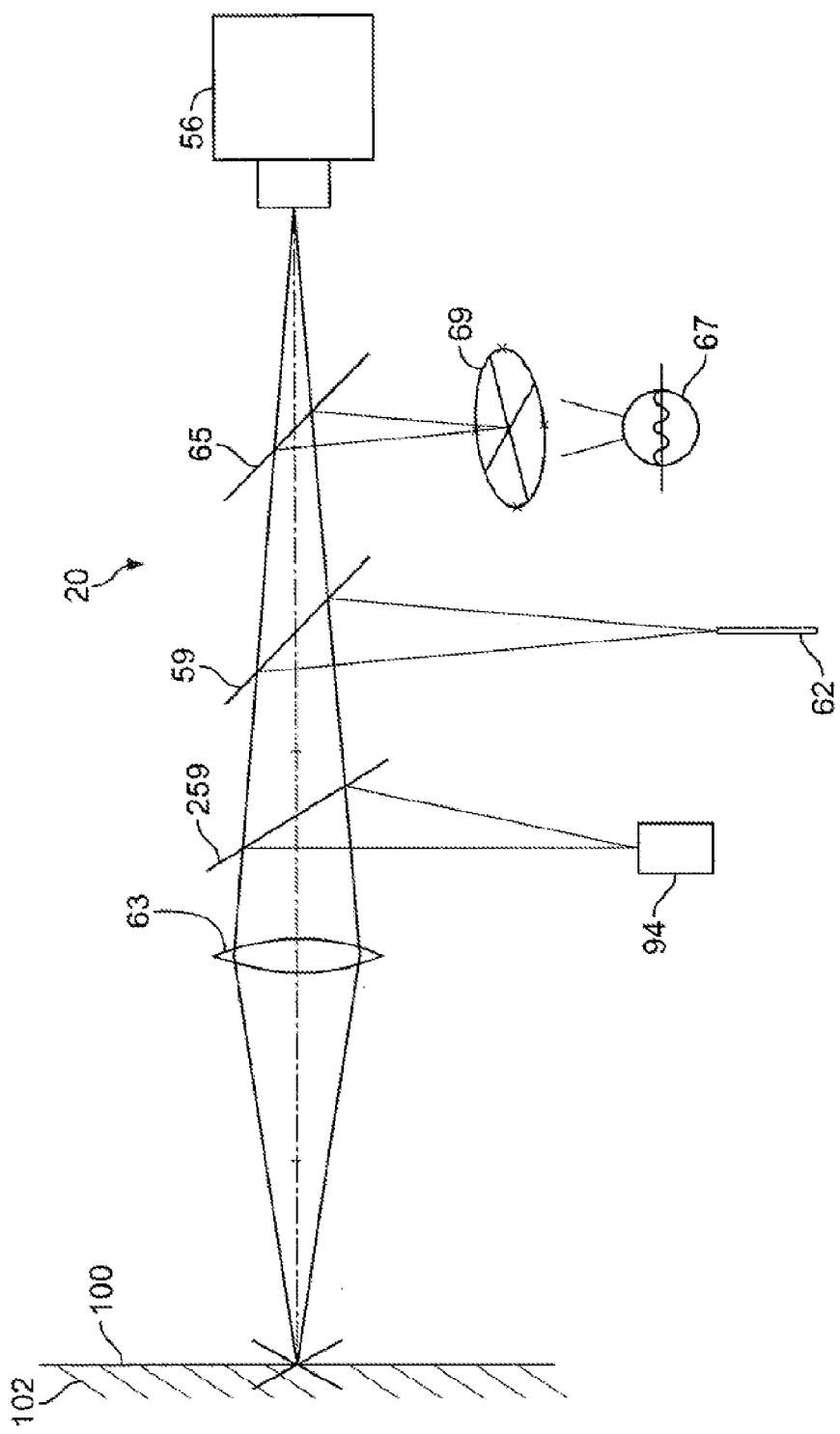
FIG. 6 is a schematic representation of components and optical paths of an imaging and repair assembly, in accordance with one embodiment.

Referring to FIG. 6, in an exemplary embodiment of the assembly 20, the camera 56 may be arranged to acquire an image at a target marked with an "X" on the surface 100 of the EC product 102, from light passing through an objective lens 63, a dichromic beam splitter 59 and a pellicle beam splitter 65. The laser device 62 may be positioned to emit a beam toward the beam splitter 59, which directs the beam through the splitter 59 and the objective lens 63 and onto the target. In addition, the assembly 20 may include an illuminator 67, such as a lamp 67, that directs light to the beam splitter 65 through a reticle 69. The beam splitter 65 redirects light from the illuminator 67 toward the target, through the beam splitter 59 and the objective lens 63. The light from the illuminator 67 desirably illuminates the region of the EC product being imaged by the camera, to improve contrast in the acquired images. In addition, the reticle 69 provides that dark reticle lines in the form of a crosshair may appear superimposed on the display of the images acquired by the camera when the outer surface of the portion of the EC product being imaged is in focus.

In one embodiment, the position of each of the objective lens, the beam splitters and the camera of the imaging unit may be controlled by the image acquisition movement unit to tilt a focal plane of the camera to compensate for tilt in an optical axis over which light travels to the camera from the target, and thus produce an image that is in focus across the entire outer surface of the portion of the EC product being imaged.

Further, the positioning of the lens 63 and the beam splitter 59, and other optical elements, such as mirrors, prisms and the like, that may be included in the path of the beam of the laser 62 included in a repair unit, and also the position of the laser 62 itself, may be controlled by the repair beam movement unit to control movement of the laser beam within the portion of the EC product which is within the laser repair range of the assembly 20.

In one embodiment, an ablating beam may be moved along a path by deflecting the beam of a laser device fixed in position by reflection or refraction. In another embodiment, an ablating beam may be moved along a path by delivering the beam of a fixed or mobile laser using an optical fiber which is part of the repair unit 50, and then translating the end of the optical fiber to move the laser beam on or along the surface of the ED product to be repaired.

In one embodiment, the laser device 62 may be controlled to remove only an upper conductive layer of a film stack forming an electrochromic device, leaving a lower conductor layer intact, by controlling parameters such as average beam power, rate of motion of the laser beam and laser pulse repetition frequency. These parameters may be controlled automatically by the control unit based on stored information, or information supplied by an operator using additional icons included on a display screen similarly as shown in FIG. 7. In another embodiment, the laser 62 device may be controlled to selectively remove any quantity of poorly conducting or non-conducting layers of a film stack between upper and lower conductors, when the upper conductor is removed and the lower conductor is not removed.

In a further embodiment, the beam emitted by the laser device may be controlled to provide a predetermined amount of overlap of laser pulses, and the pulses may be shorter than 1000 nanoseconds, shorter than 100 nanoseconds, or shorter than 50 nanoseconds. In addition, with the pulse length less than 1000 nanoseconds, pulse repetition frequency and movement of the beam may be controlled to avoid excessive exposure of a given spot along a center line of beam travel, thereby avoiding thermal damage, such as to glass within the EC product and edges of the portion of the electrochromic film stack being ablated. In one embodiment, the number of times that a given spot along a center line of beam travel is exposed ("pulse overlap") may be is less than 1000, less than 10, or less than 2. As different film stack compositions can have different damage thresholds, the maximum pulse width to be used to avoid thermal damage may be determined automatically by the control unit, based on supplied information of electrochromic device film properties of the EC product.

In another embodiment, the laser device 62 may be controlled to ablate along a same path in the EC product that previously underwent laser ablation, where the region in the electrochromic device corresponding to the path includes non-ablation portions or gaps that were not previously ablated. The gaps, for example, may have been caused by the laser device dropping a pulse, an opaque particle blocking the beam or a spatially limited variation in film stack ablation properties. In such embodiment, laser ablation may be performed to ablate the entire film stack at the gaps.

Referring to FIGS. 3-4, in one embodiment, the positioning indicating unit 18 may include an angular control unit 96 operable to change the angle at which the beam from the laser pointer 94 is directed away from the position indicating unit 18. In addition, the assembly 20 may provide a capability to angle or tilt the laser device 62 and the camera 56 relative to the mounting unit when the assembly 20 is attached to the mounting unit. The use of the angular control unit 96 may be desirable to indicate a position for mounting the mounting unit when a defect is located too close to an edge of the EC product, such as near a window frame enclosing the EC product, such that, without angling the laser device and camera of the assembly 20 attached to the mounting unit, the assembly attached to the mounting unit cannot be arranged so that the portion of the EC product including the defect is within the imaging and repair ranges. The assembly 20, by being adapted such that the laser device 62 and the camera 56 may be tilted or angled, provides that an optical axis along which light travels from the EC product to the camera 56, and an optical axis along which the repair beam is directed to the EC product, may be in accordance with an angle indicated by the angular control unit.

Figure 9:
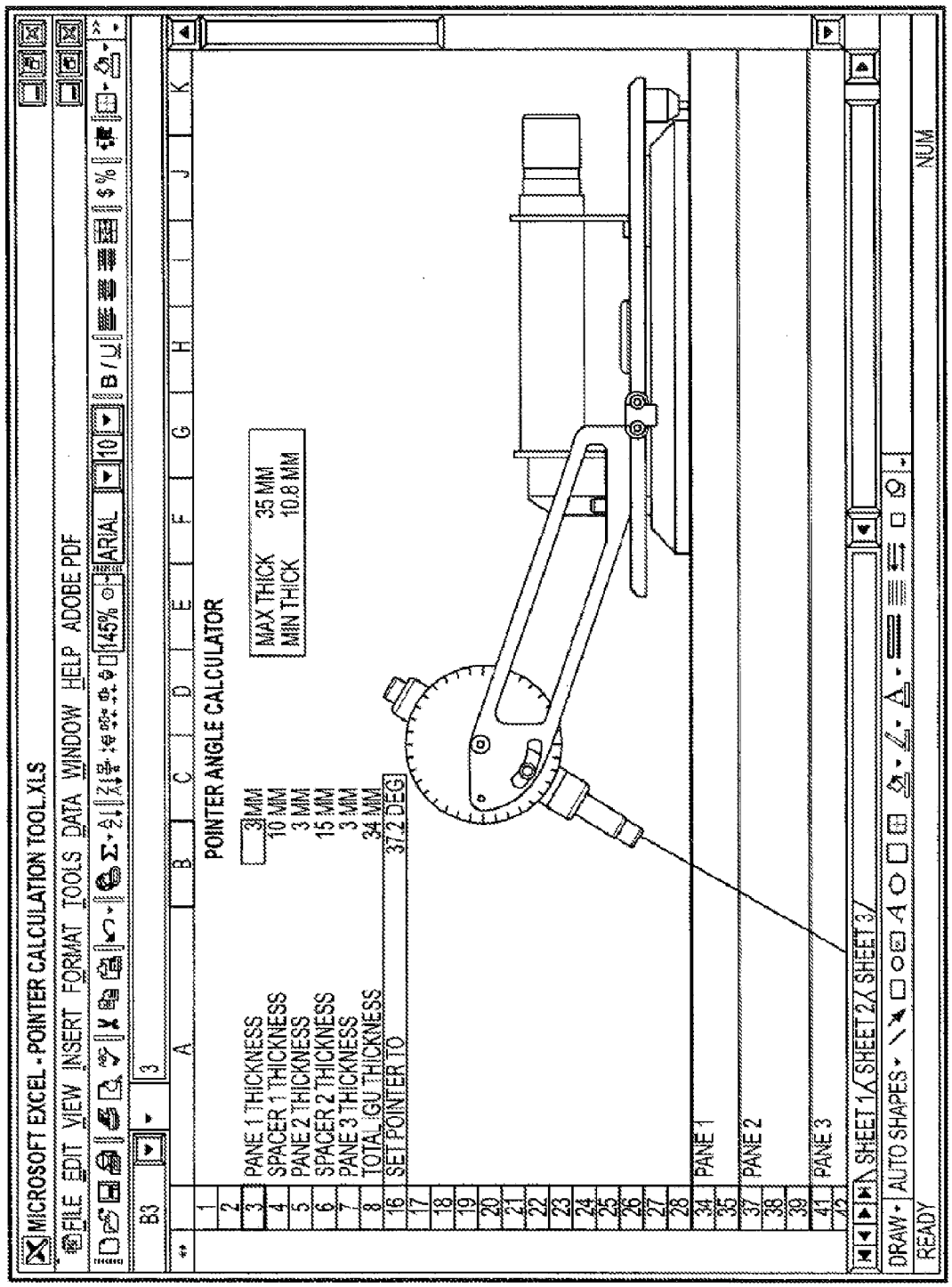
FIG. 9 is a screen display for determining a position at which to mount a mounting unit of an apparatus for repair of a defect in an electrochromic device to a surface of an electrochromic device product, in accordance with one embodiment.

In one embodiment, the control unit may provide for display of a display screen on the display unit 16 to assist the operator with use of the angular control unit, as shown in FIG. 9. The control unit may determine, based on input of dimensions of the EC product to be repaired, an angle for positioning of the angular control unit. The positioning angle indicates an angle for tilting the camera and laser device of the assembly 20 attached to the mounting unit with respect to a line orthogonal to the surface of the EC product including the defect to be repaired, such that the defect is within the imaging and repair ranges of the assembly.

In a further embodiment, the position indicating unit 18 may be permanently mounted to the mounting unit 24, and optionally be a part of or integral with the assembly 20. Referring to FIG. 6, in an embodiment where the position indicating unit is integral with the assembly 20, the laser source 94 may be arranged to introduce a beam coaxially into the optical path that light travels from the EC product to the camera 56, such as using a beam-splitter or movable mirror 259.

In an alternative embodiment, the position indicating unit 18 may be attachable to the mounting unit so that the unit 18 can be moved to a position that allows the assembly 20 to be attached to the mounting unit and be operated to image and repair defects in the EC product, without detaching the unit 18 from the mounting unit.

In an alternative embodiment, the position indicating unit may include a structural element in the form of a pointing arrow or rod, an optical lens with crosshairs or like indicating elements that may be used, similar to the beam of the laser pointer, to indicate a position at which to fixedly position the mounting unit attached to the position indicating unit.

In another embodiment, the mounting unit may include an adhesive pad for attachment of the mounting unit to a support surface.

In still another embodiment, the mounting unit may include a mechanical element extending from the base 72, such as a frame, tripod, arms or the like, and terminating at a clamp or like structure that may be used to fixedly mount the mounting unit to another surface, such as a window frame, ladder, building mounting structure or building framework mount, in accordance with a position indicated by the position indicating unit 18.

In a further embodiment, the mounting unit may be electrically connected to the control unit and power supply unit, and include an energizable magnet to permit mounting of the mounting unit to a metallic mounting surface, such as a ferromagnetic window frame.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for repair of a defect in an electronic energy control device comprising:

indicating a position at which to fixedly position a mounting unit relative to a portion of an electronic energy control device including a defect to be repaired, the electronic energy control device to be repaired being fixed in position;

mounting the mounting unit to a support surface to fixedly position the mounting unit in accordance with the indicated position; and with an imaging and repair assembly, acquiring optical images and emitting a light beam that circumscribes the defect by ablating films of the electronic energy control device in proximity and external to the defect, thereby isolating the defect from a remainder of the electronic energy control device, wherein, when the mounting means is mounted to the support surface to fixedly position the mounting unit at the position indicated, the portion of the electronic energy control device to be repaired is within an imaging range and a laser repair range of the assembly attached to the mounting unit.

2. The method of claim 1, wherein the assembly is detachably attachable to the mounting unit.

3. The method of claim 1, wherein the indicating of the position is by a position indicating means detachably attachable to the mounting unit.

4. The method of claim 1 further comprising:
displaying an image of the portion of the electronic energy control device to be repaired and indicia of a path for moving the beam within and to intersect the portion of the electronic energy control device to be repaired.

5. The method of claim 1, wherein the electronic energy control device to be repaired is an electrochromic device.

6. The method of claim 1, wherein the indicated position is determined based on controlling a position of a position indicating element relative to the electronic energy control device to be repaired.

7. The method of claim 6, wherein the position indicating element is movable across a surface of the electronic energy control device to be repaired.

8. The method of claim 6, wherein the position indicating element is an optical signal emission unit.

9. The method of claim 8, wherein the indicated position is determined based on controlling emission of an optical signal from the optical signal emission unit toward the portion of the electronic energy control device to be repaired.

10. The method of claim 9, wherein the controlling of the emission of the optical signal includes controlling a direction of the emission of the optical signal.

* * * * *